United States Patent Office 3,430,702
Patented Mar. 4, 1969

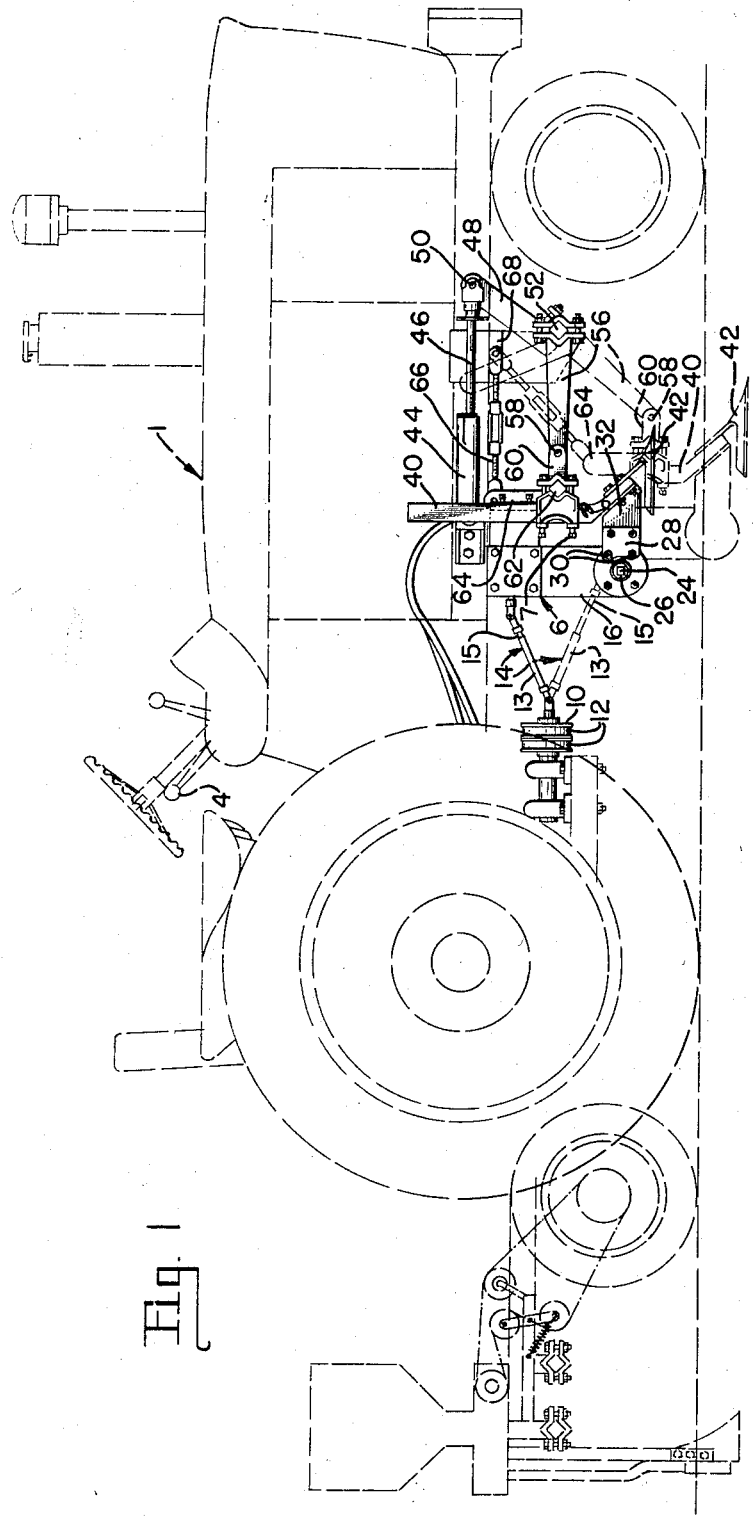

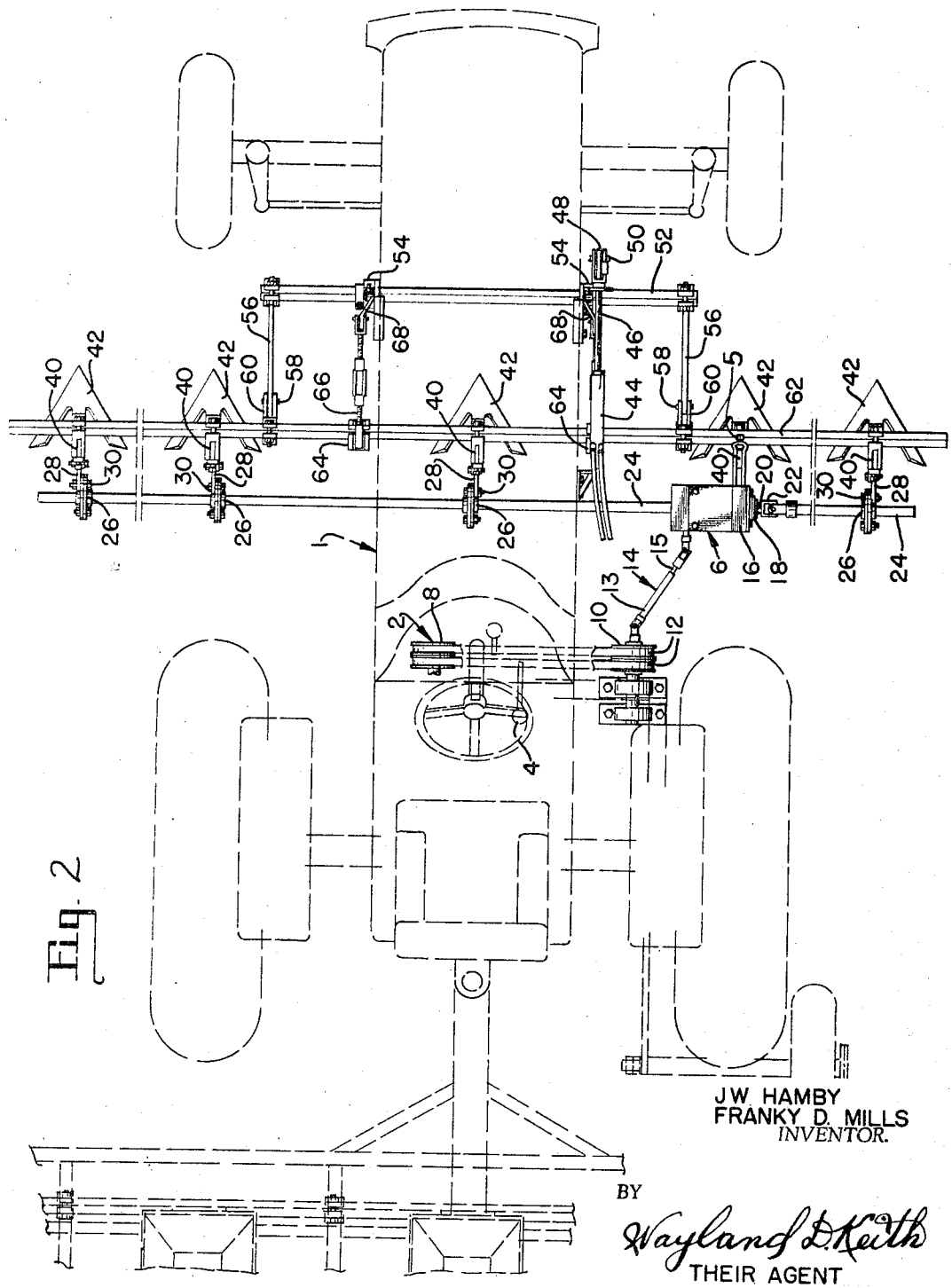

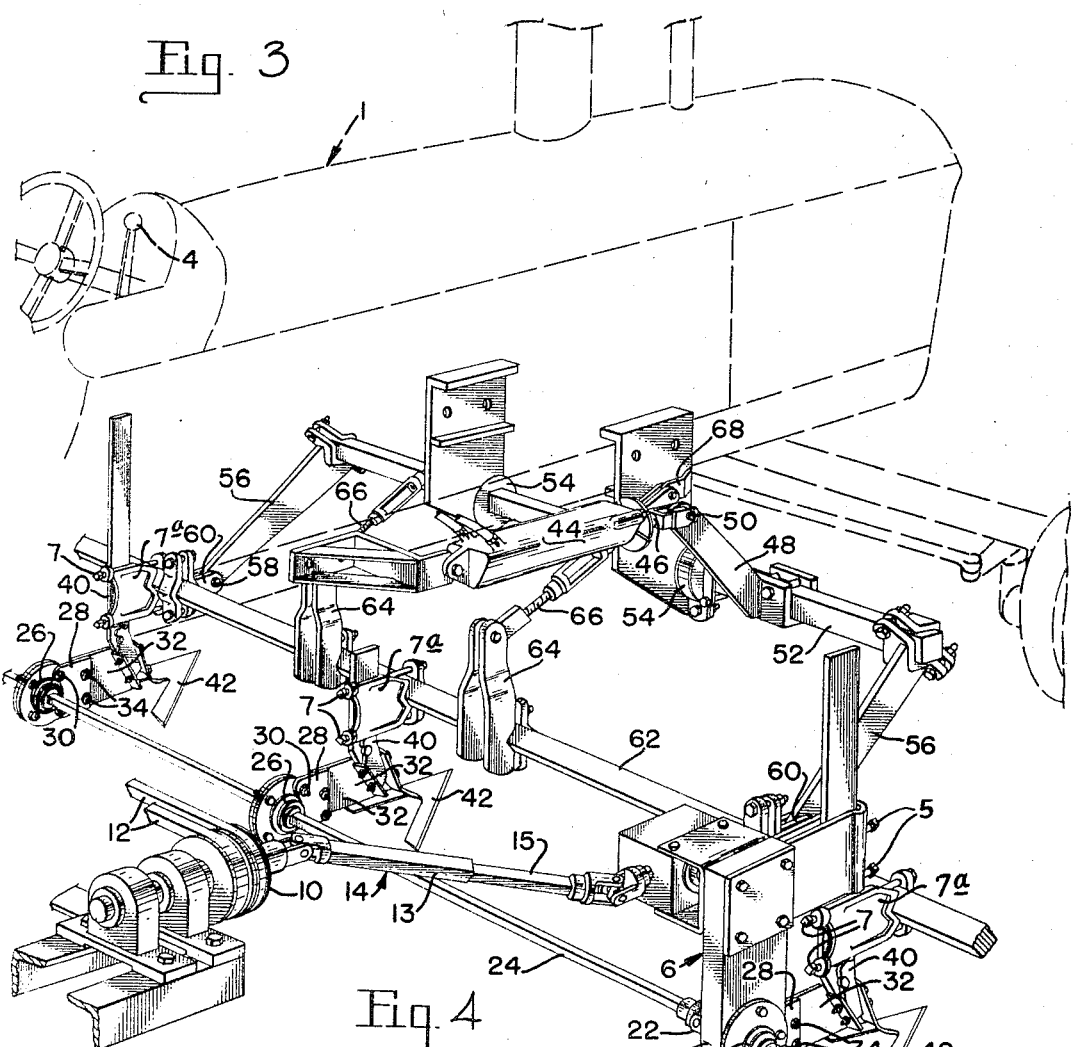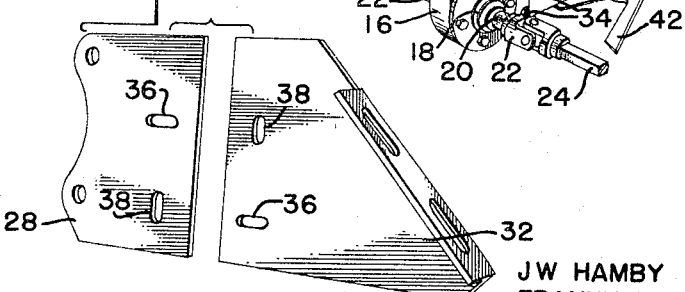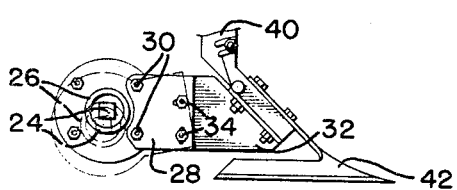

3,430,702
TRACTOR MOUNTED ROD WEEDER
J W Hamby and Franky D. Mills, both of 2905 W. 7th St., Plainview, Tex. 79072
Filed Mar. 10, 1966, Ser. No. 533,145
U.S. Cl. 172—44      5 Claims
Int. Cl. A01b *39/18, 33/08*

ABSTRACT OF THE DISCLOSURE

A rod weeder for mounting intermediate the front and rear wheels of a tractor and which is powered by the tractor power take-off so that the operator of the tractor may view the weeding action of the rod weeder at all times. The depth of the rod of the rod weeder is readily adjustable. Provision is made for enclosing the primary working mechanism within dust cases to prevent the gearing from being exposed to the action of dirt and grit. The rod weeder and the mechanism associated therewith is readily assembled onto a tractor and readily removed therefrom in a minimum of time.

---

The present application was co-pending with the application of J W Hamby, Ser. No. 392,759, Rod Weeder With Enclosed Dust-Tight Chain Drive, filed Aug. 28, 1964, now Patent No. 3,283,830, issued Nov. 8, 1966, which patent application and patent are of common ownership.

This invention relates to rod weeders, and more particularly to a rod weeder for mounting intermediate the front and rear wheels of a tractor, and which rod weeder is so powered, from the power take-off of the tractor that the operation of the rod weeding equipment can be carried out accurately and simultaneously with planting and other cultivating functions performed by a farm tractor.

Various rod weeders have been proposed heretofore, but these, for the most part, were positioned rearward of the tractor; the planter and/or cultivator mechanism pulled by the tractor would often conflict with the rod weeder, which oftentimes resulted in more than one pass over the terrain being necessary to complete an operation which, with the present rod weeder, can be done at one pass over the terrain.

The applicants are aware that an attempt has been made to mount rod weeders intermediate the front and rear wheels of a tractor; however, as far as the applicants have been able to determine, this required a chain to extend from a point rearward of the tractor over two sprockets connected directly to the tractor axle, whereby the rod weeder necessarily would have to be driven in a direct ratio to the rotation of the axle of the tractor. Furthermore, the raising and lowering of the rod weeder required that the shaft centers be maintained the same at all times or the chain would become too loose to drive the weeder or it would become too tight, which would cause the chain to break.

The present invention is so constructed that the power from the tractor is taken from a power take-off shaft which is independent of the drive axle of the tractor, whereby any desired speed may be obtained within the range of the power take-off, independently of the movement of the tractor. Thereby, the rod of the rod weeder may be rotated at a relatively high speed, although the tractor may be moving very slowly. Furthermore, the present arrangement of a rod weeder is so constructed that it may be raised and lowered by a tool bar which is hydraulically operated, and which rod weeder is on a second tool bar shaft, which shaft is so connected with a stationary anchor, that the second tool bar may be raised and lowered, thereby to maintain the plow shanks in substantially the same fixed relation regardless of whether the plow is engaged in the soil or is above the soil.

The present tool bar attachment for a tractor is so constructed that the tool bar is driven by a telescoping, universal joint drive shaft with no exposed sprockets or gears being associated therewith.

The present rod weeder has certain improvements over the invention disclosed in the J W Hamby application for patent, Ser. No. 392,759 for Rod Weeders With Enclosed Dust-Tight Chain Drives, filed Aug. 28, 1964, now Patent No. 3,283,830. The present rod weeder also has a dust-tight gear housing, which is so constructed that a telescoping universal drive shaft is utilized to convey the power from the power take-off driven pulley to the rod weeder with a minimum of abrasion and wear, which is present as the soil is being tilled.

The present rod weeder is so constructed that it may be attached to a transverse, multi-row tool bar and, if so desired, additional cultivating instruments, such as additional plow shanks, may be attached to the tool bar forward of the rod weeder for simultaneous cultivating action with the rod weeder. This arrangement, coupled with the usual agricultural implement, which is either towed behind the tractor or connected thereto, as by a three point power lift, is such that multiple crop operations can be performed at a single pass over the terrain.

An object of this invention is to provide a rod weeder which may be connected to a transverse, multi-row tool bar intermediate the front and rear wheels of a tractor and which is connected to an independent power take-off so that the rod weeder may be driven at a speed independent of the speed of the tractor over the terrain.

Another object of the invention is to provide a rod weeder which is positioned intermediate the front and rear wheels of a tractor, which rod weeder is driven by a power take-off on the tractor. The power take-off drives through endless V-belts to drive a telescoping universal shaft whereby the tool bar and rod weeder may be raised and lowered while maintaining the same driving efficiency between the power take-off and the rod weeder.

Still another object of the invention is to provide a rod weeder attachment for a tractor, wherein the rods of the rod weeder are mounted on individually adjustable bearings to enable each of the rods of the rod weeder to be raised or lowered or moved forward or rearward, within limits of the mechanism, to obtain proper alignment between the various bearings of the rod weeder and to enable the adjusting of each of the rods to the proper depth with respect to the plow.

A further object of the invention is to provide a rod weeder which is mounted intermediate the front and rear wheels of a tractor, whereby the shaft of the rod weeder and plow shanks are raised in such manner as to maintain the plow at the same angle with respect to the ground regardless of whether the plow is above the level of the terrain or below the level of the terrain.

A still further object of the invention is to provide a rod weeder which is mounted intermediate the front and rear wheels of a tractor, which rod weeder may be readily attached to or detached from a tractor without having to completely disassemble the rod weeder unit.

An additional object of the invention is to provide a tractor mounted rod weeder for attachment between the front and rear wheels of a tractor, the operation of which rod weeder is visible to the operator during the operation thereof, simple in construction, easy to operate, low in the cost of manufacture, and easy to assemble and disassemble for maintenance.

With these objects in mind and others which will become manifest as the description proceeds, reference is to be had to the accompanying drawings in which like reference characters designate like parts in the several views thereof, in which:

FIG. 1 is a side elevational view of a tractor shown in dashed outline, showing a planter, also in dashed outline, attached thereto, a power take-off arrangement associated therewith being shown in full outline, showing a transverse, multi-row tool bar mounted on the tractor intermediate the front and rear wheels thereof, a plow shank and rod weeder associated therewith, being shown in full outline in raised position, the dashed outline indicating the operating position;

FIG. 2 is a top plan view of a tractor, which is shown in dashed outline, a planter mechanism connected thereto being shown in dashed outline, a power take-off mechanism shown as associated therewith for obtaining multi-speed drives from the tractor independent of the speed of the tractor, and showing the power take-off connected in driving relation with a transverse, multi-row rod weeder which is shown in full outline attached to the tractor with parts broken away and shortened to bring out the details of construction;

FIG. 3 is an enlarged fragmentary, perspective view of a portion of a tractor shown in dashed outline, showing a portion of a power take-off drive, a portion of a transverse, multi-row tool bar and the associated mechanism connected thereto and to the tractor, showing the rod weeder drive mechanism connected to the power take-off drive through a telescoping universal joint drive shaft, and showing the rod weeder drive mechanism supported on a plow shank so the rods of the rod weeder extend transversely to the line of movement of the tractor;

FIG. 4 is an exploded, perspective view of a rod weeder bearing mounting bracket, showing slots therein positioned at right angles to each other to enable a multiplicity of adjustments of the rod weeder bearing with respect to the plow shank; and FIG. 5 is a side elevational view of the lower portion of a plow shank showing a plow thereon and a rod weeder bearing bracket mounted thereon, with one position of the rod weeder being shown in full outline, with an adjusted position of the rod weeder and bearing being shown in dashed outline.

With more detailed reference to the drawings, the numeral 1 designates generally a tractor of the general type used in the cultivation of the soil, which tractor has front and rear wheels and a power take-off drive generally designated by the numeral 2, and while the power take-off is shown to be beneath the tractor on this particular drawing, it is to be understood that it is within the purview of the invention to utilize a power take-off whether it be beneath, on the side of the tractor, or on the rear thereof. The power take-off is usually of the multi-speed type, which has a gear shift lever 4 to obtain the desired selected speed for operating a rod weeder mechanism generally designated by the numeral 6. The power take-off drive 2 is shown to have a pulley 8 which interconnects with a pulley 10 through V-belts 12 so as to drive a telescoping universal drive shaft 14 to drive the gears within rod weeder drive 6, which rod is polygonal and is of the same general character as that of the above-mentioned patent application, and which drives through a shaft, sprocket and chain arrangement into and through a housing 16 which is enclosed and dust-tight. The rod weeder housing has bearings 18 on either side thereof with shafts 20 extending outward on each side thereof, and each which shaft has a universal joint 22 thereon, which universal joints are connected in driving relation with transverse, multi-row rod weeder rods 24, the rods of which weeder are journaled in bearings 26 which are attached to a bifurcated bracket 28 by a pair of bolts 30.

The bracket 28 is detachably connected to bracket 32 by bolts 34, which bolts pass through horizontal slots 36 in the respective brackets 28 and 32 and through vertical slots 38 in the respective brackets 28 and 32. It is preferable to have these slots of such length as to give the maximum movement to the bearings 26 necessary to properly align the respective rods 24 with bearings 18, with a minimum of misalignment. The bolts 34 each pass through a slot 36 and a slot 38, which will enable relative vertical movement, the length of the respective vertical slots 38 less the diameter of the bolt, and which will enable horizontal movement of a distance of the length of the horizontal slots 36 less the diameter of the bolt 34. However, a combination of movements may be had within the lengths of the combined slots 36 and 38. This enables ready adjustment, and also, ready detachment of the bracket 28 from bracket 32 by the removal of two bolts, which will enable the rods 24 to be removed without removal of bracket 32 from the plow shank. The universal joints 22 may be readily detached from shaft 20 and from polygonal rods 24 to enable rods 24 to be removed with bifurcated brackets 28. Therefore, the adjustment of plow 42 with respect to the terrain remains unchanged.

It is to be pointed out that the telescoping universal shaft 14 permits raising or lowering the plow 42 and the rod weeder rod 24, which is connected therewith, while the rods are rotating, and without misalignment of any of the driving mechanism, as the telescoping universal shaft 14 is comprised of a square tubular member 13 and a complementary, slidable squared rod 14, which slidably adjusts to any variation in forward or rearward movement of the rod weeder mechanism with respect to pulleys 10, with which the telescoping universal shaft 14 is connected.

The tractor 1 has a hydraulic cylinder 44 pivotally attached to one end thereof and has a plunger 46 operatively mounted therein, which plunger is pivotally attached to a lever 48 by means of a pivot pin 50. The lever 48 is secured to a transverse bar 52, which transverse bar 52 is fitted in bearings 54 which are mounted on the frame of the tractor 1.

An arm 56 is mounted near each end of the transverse bar 52, and extends outward therefrom. Each arm 56 is connected, by a pivot pin 58, to an outstanding lug 60. The outstanding lugs 60 are secured to transverse tool bar 62, to which tool bar the respective plow shanks 40 are attached.

The tool bar 62 has upstanding a pair of apertured members 64 rigidly attached thereto. An adjustable bar 66 is pivotally attached at one end to each member 64 and the other end of each bar 66 is pivotally attached to an apertured lug 68, which lugs each form pivot connection means, which associated with the tractor 1 and stationary with respect thereto. Upon actuation of plunger 46, which is pivotally connected to arm 48, the arm 48 will be moved arcuately to rotate transverse bar 52, which rotary movement of bar 52 will, in turn, transmit arcuate movement to arms 56 which are pivotally connected to transverse tool bar 62, which will cause relative movement therebetween so as to raise or lower plow shanks 42, on which plow shanks the respective plows 42 are mounted, rod weeder mechanism 6, and rod weeder rod 24.

The use of adjustable bars 66, which pivotally interconnect the upstanding members 64 and the apertured lugs 68, will cause the tool bar 62 to be moved in a substantially vertical plane, thereby maintaining the plows 42 and the rods 24 of the rod weeder in relative relation with respect to the terrain.

OPERATION

The present rod weeder may be used with any tractor which employs a power take-off which transmits power in driving relation to a point intermediate the forward and rear wheels; however, in the present device, the power take-off, which is preferably a multi-speed power take-off 2, is positioned forward of the rear wheels and is driven through pulleys 8, belts 12, and pulley 10 to a shaft 11, which shaft 11 is connected in driving relation with a telescoping, universal shaft 14 which drives into and through a gear unit of rod weeder mechanism 6. The mechanism is of a character described in the above-mentioned application, and drives the polygonal rod weeder rods 24 which are positioned rearward of plows 42, so as to be below the surface of the terrain when in normal operating position. Each bearing 26 of the rod weeder is mounted on adjustable bifurcated bracket 28, which enables the rod weeder rods 24 to be aligned with bearing 18 in the housing 16 of the rod weeder drive. By adjusting the rod weeder mechanism 6 upward or downward on one of the plow shanks 40 and maintaining this in adjusted relation on the plow shanks by set screws 5, the rod weeder rods 24 may be quickly and easily adjusted to any operating position with respect to plows 42 and to the surface of the terrain, as each bolt 34 passes through respective sets of vertical and horizontal slots 38 and 36 in brackets 28 and 32 which enables movement of the respective shaft bearings 26 into adjusted position, one of which positions is shown in dashed outline in FIG. 5.

The present arrangement of the rod weeder enables an operator to visually observe the action of the rod weeder rods 24 with a minimum of discomfort, as he can readily glance downward and forward at the work being performed more easily than if the rod weeder were trailing behind the tractor, and by having the work thus arranged, by manipulation of hydraulic controls (not shown) the rods 24 of the rod weeder may be maintained in the correct operating position at all times.

It is to be further pointed out that, since the rods 24 of the rod weeder are being driven by the power take-off of a tractor, independently of the rotation of the axle of the tractor, the rods may be rotated at the desired speed even though the tractor is moving very slowly or not at all.

Set screws 7 threadably engage the tool bar clamps 7a in which plow shanks 40 are mounted, so that the set screws 7 enable individual shanks to be adjusted relative to the tool bar and will enable the proper depth of each plow 42 to be maintained, and the proper alignment of the rods 24 with bearings 26 is also maintained.

The rotatable transverse bar 52 has downwardly depending arms 56 which are pivotally attached to the transverse tool bar 62. The tool bar 62 also has upstanding, apertured members 64 thereon to which is pivotally connected an adjustable connecting bar 66. The opposite end of the adjustable connecting bar 66 is pivotally connected to stationary lug 58 on the tractor, so, with the axis of the rotatable transverse bar 52 and the pivot point of lug 68 remaining the same, the tool bar 62 is raised and lowered in substantially a parallelogram manner, as will best be seen in full outline and in dashed outline in FIG. 1. In so doing, the plow 42 is maintained in substantially the same position. However, the relative position of the plow shank and the plow may be readily adjusted by a turnbuckle on connecting bar 66. This particular tool bar arrangement enables the tractor to readily carry a plow, plow rod weeder, or other tilling tools with the same degress of angularity with respect to the surface of the terrain, regardless of the depth of the plow, within the normal working limits of the parallelogram lifting arrangement as described above.

While the invention has been illustrated and described in some detail, it is to be understood that changes may be made in the details of construction, and adaptations made to different installations.

Having thus clearly shown and described the invention, what is claimed as new and desired to be secured by Letters Patent is:

1. A rod weeder to be used in connection with a tractor, which tractor has front and rear wheels, and a power take-off which is independent of the axles of the tractor; which rod weeder comprises;
  (a) a transverse bar mounted on the tractor below the lower side thereof, which transverse bar is mounted for relative arcuate movement about the axis thereof with respect to the tractor,
    (1) an outwardly extending lever secured to said transverse bar,
    (2) at least one arm secured to said transverse bar and extending outwardly therefrom,
    (3) a transverse tool bar below the tractor and pivotally connected to said outwardly extending arm,
      (i) upstanding, apertured members mounted on and secured to said tool bar,
  (b) a hydraulic cylinder pivotally mounted on the tractor, which hydraulic cylinder is also pivotally connected to said outwardly extending lever,
  (c) pivot members mounted on the tractor,
    (1) connecting bars pivotally connected to said upstanding apertured members and to said pivot members on the tractor,
  (d) plow shanks, each adapted to have a plow mounted thereon, mounted on said tool bar and depending therefrom,
  (e) rod weeder gear mechanism attached to one of said plow shanks and extending rearwardly therefrom,
    (1) each of the other plow shanks having a mounting bracket attached thereto and extending rearwardly therefrom,
    (2) bearings mounted on each said rearwardly extending bracket,
  (f) weeder rods connected in driving relation with said rod weeder gear mechanism and extending outward therefrom on each side thereof, to cultivate the entire area beneath the tractor and outwardly a spaced distance on each side of the line of travel of the wheels thereof,
    (1) said respective bearings in said brackets being positioned so said weeder rod may be operated in a horizontal plane near the lower end of the respective plow shanks, and
  (g) transmission drive means interconnecting said rod weeder gear mechanism and the power take-off of the tractor in driving relation.

2. A rod weeder to be used in connection with a tractor as defined in claim 1; wherein
  (a) each said mounting bracket is a two-piece bracket, one piece of which bracket has a bearing mounted therein,
  (b) each mounting bracket has a slot formed therein at a right angle to each other, and
    (1) a bolt passing through a slot in each bracket which slots are arranged at a right angle to each other to secure each said bracket mounting each said bearing in fixed, adjusted relation to the respective plow shanks.

3. A rod weeder to be used in connection with a tractor as defined in claim 1; wherein
  (a) each said bracket, mounting said bearings, has a recess formed therein complementally receiving a portion of bearing,
  (b) each said bearing being apertured to receive a bolt therethrough and through said bracket to hold said bracket and said bearing in binding relation.

4. A rod weeder to be used in connection with a tractor, as defined in claim 1; wherein
  (a) said transverse tool bar has at least two levers mounted thereon, and secured thereto,
  (b) pivot connection means on each said lever,
  (c) pivot connection means mounted on said tractor forward of said pivot connection means on each of said levers and lying in a transverse horizontal plane above the axis of said transverse bar on said tractor, and (d) an adjustable bar interconnecting the pivot connection means on each said lever and the respective said pivot connection means on said tractor so as to substantially form a parallelogram with respect to the pivot points of said pivot connection means when said tool bar is raised and lowered.

5. A tool bar lift for a tractor having a rod weeder connected thereto, which tool bar lift comprises;
 (a) a transverse bar mounted on the tractor and extending below the lower side thereof, which transverse bar is mounted for arcuate movement with respect to the tractor,
  (1) an outwardly extending lever secured to said transverse bar,
  (2) a pair of arms secured to said transverse bar, one near each end thereof, which arms extend outwardly therefrom,
 (b) a transverse tool bar extending below the lower side of said tractor,
  (1) a pivot member on the forward side of said tool bar near each end thereof,
  (2) each outwardly extending arm on said transverse bar being pivotally connected to one of said pivot members on said tool bar,
  (3) upstanding, apertured members mounted on said tool bar,
 (c) pivot members mounted on the tractor,
  (1) bars pivotally connected to said upstanding apertured members and to said pivot members on the tractor,
 (d) spaced apart plow shanks detachably connected to said tool bar and extending downwardly therefrom,
  (1) plows on said plow shanks,
 (e) a rod weeder bearing support member mounted on said spaced apart plow shanks,
  (1) a rod of said rod weeder being positioned intermediate the wheels of the tractor and being adapted to extend outward beyond the path defined by the wheels of the tractor,
 (f) a rod weeder drive mechanism associated with one of said plow shanks,
  (1) said rod of said rod weeder being connected in driving relation with said drive mechanism,
 (g) bars pivotally connected to said upstanding, apertured members on said tool bar and to said pivot members on said tractor to maintain said upstanding, apertured members and said plow shanks in upright position, and
 (h) a hydraulic cylinder pivotally mounted on the tractor, which hydraulic cylinder is pivotally connected to said outstanding lever so as to rotate said transverse bar to move the mechanism associated therewith in substantially upright relation to enable the rod of said rod weeder to be lowered a predetermined distance below the surface of the soil and to engage the plows on said plow shanks in plowing relation into the soil.

References Cited

UNITED STATES PATENTS

| | | | |
|---|---|---|---|
| 1,973,985 | 9/1934 | Johnson et al. | 172—44 |
| 2,364,043 | 12/1944 | Adiens | 172—60 |
| 2,379,781 | 6/1945 | Blaydes | 172—44 |
| 2,596,270 | 5/1952 | Miller et al. | 172—44 |
| 2,713,299 | 7/1955 | Shager et al. | 172—382 X |
| 3,283,830 | 11/1966 | Hamby | 172—44 |

ANTONIO F. GUIDA, *Primary Examiner.*

WALTER J. CONLON, *Assistant Examiner.*